US012619889B2

(12) United States Patent
    Shinkuma

(10) Patent No.: US 12,619,889 B2
(45) Date of Patent: May 5, 2026

(54) LEARNING-TYPE REAL SPACE INFORMATION FORMATION SYSTEM

(71) Applicant: KYOTO UNIVERSITY, Kyoto (JP)

(72) Inventor: Ryoichi Shinkuma, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 1220 days.

(21) Appl. No.: 17/277,623

(22) PCT Filed: Oct. 2, 2019

(86) PCT No.: PCT/JP2019/038865
    § 371 (c)(1),
    (2) Date: Mar. 18, 2021

(87) PCT Pub. No.: WO2020/075584
    PCT Pub. Date: Apr. 16, 2020

(65) Prior Publication Data
    US 2021/0350261 A1     Nov. 11, 2021

(30) Foreign Application Priority Data
    Oct. 11, 2018     (JP) ................................. 2018-192689

(51) Int. Cl.
    *G06N 5/04*          (2023.01)
    *G06N 20/00*         (2019.01)
(52) U.S. Cl.
    CPC .............. *G06N 5/04* (2013.01); *G06N 20/00* (2019.01)
(58) Field of Classification Search
    CPC .................................. G06N 5/04; G06N 20/00
    See application file for complete search history.

(56) References Cited

U.S. PATENT DOCUMENTS

| | | | |
|---|---|---|---|
| 9,872,125 B2 | 1/2018 | Kami et al. | |
| 9,977,488 B1 * | 5/2018 | Kong | .................... G06F 1/3287 |

(Continued)

FOREIGN PATENT DOCUMENTS

| | | |
|---|---|---|
| JP | 2014-209311 A | 11/2014 |
| JP | 2016-009342 A | 1/2016 |
| JP | 2018-084854 A | 5/2018 |

OTHER PUBLICATIONS

Ghasemzadeh, Hassan, et al. "Power-aware computing in wearable sensor networks: An optimal feature selection." IEEE Transactions on Mobile Computing 14.4 (2014): 800-812. (Year: 2014).*

(Continued)

*Primary Examiner* — Andrew T Chiusano
(74) *Attorney, Agent, or Firm* — Millen, White, Zelano & Branigan P.C.; William F. Nixon

(57) ABSTRACT

A learning-type real space information generation system uses sensor data that can be efficiently uploaded from an information terminal device to a server, and which is capable of generating highly accurate real space information. A plurality of information terminal devices and a server are connected via in a communicable state via a network. The control unit of each information terminal device controls a transmission unit, based on the importance of elements configuring real space information, the importance being determined by an importance determination unit of the server such that sensor data corresponding to an element configuring the real space information and having high importance is preferentially transmitted. The generation unit of the server uses a feature model to generate real space information, based on elements configuring real space information and having high importance extracted by an extraction unit from the most recent sensor data received by a reception unit.

9 Claims, 13 Drawing Sheets

(56) References Cited

U.S. PATENT DOCUMENTS

| | | | | |
|---|---|---|---|---|
| 2015/0006446 A1* | 1/2015 | Chiba | ..................... | G01P 13/00 |
| | | | | 702/187 |
| 2016/0057561 A1* | 2/2016 | Kami | ................. | H04W 68/005 |
| | | | | 370/329 |
| 2017/0208493 A1* | 7/2017 | Masson | .................. | G08B 25/08 |
| 2018/0144621 A1 | 5/2018 | Arai et al. | | |
| 2018/0240011 A1* | 8/2018 | Tan | ........................... | G06F 9/46 |
| 2018/0261020 A1* | 9/2018 | Petousis | .............. | G07C 5/0841 |
| 2018/0365977 A1* | 12/2018 | Inoue | ...................... | H04W 4/70 |
| 2019/0030713 A1* | 1/2019 | Gabardos | ................ | B25J 9/163 |
| 2019/0331832 A1* | 10/2019 | Chandra | ................. | G01W 1/06 |
| 2019/0387475 A1* | 12/2019 | Khawand | ........... | G06F 11/3013 |
| 2020/0090644 A1* | 3/2020 | Klingler | .............. | G06N 3/0499 |

OTHER PUBLICATIONS

Yamada, Yoshinobu, et al. "Feature-selection based data prioritization in mobile traffic prediction using machine learning." 2018 IEEE Global Communications Conference (GLOBECOM). IEEE, 2018. (Year: 2018).*

Inagaki, Yuichi, et al. "Prioritization of mobile IoT data transmission based on data importance extracted from machine learning model." IEEE Access 7 (2019): 93611-93620. (Year: 2019).*

International Search Report for PCT/JP2019/038865 dated Dec. 17, 2019.

English Abstract for JP2016009342, Publication Date: Jan. 18, 2016.

* cited by examiner

Information terminal device 1

FIG. 5

Prediction of distribution at the time +1

Longitude direction

Latitude direction

Prediction

Distribution collected at the time-1
1: Clouded, 0: Not clouded, Blank: No data received Longitude direction Latitude direction

| | Word | Object |
|---|---|---|
| A | Security gurad<br>Cash<br>Escape<br>Security camera<br>Police<br>Braking | Sunglass<br>Black cloth<br>Knit hat<br>Gloves |
| B | Enjoy<br>Meal<br>Play<br>Friend<br>Shopping<br>Caffe | Smile<br>Shopping<br>Bright cloth |

Prediction ⇨

| Crime rate |
|---|
| High |
| Low |

FIG. 14

LEARNING-TYPE REAL SPACE INFORMATION FORMATION SYSTEM

TECHNICAL FIELD

The present invention relates to a learning-type real space information generation system in which a plurality of information terminal devices and a server computer are connected in a communicable state via a network, sensor data acquired by the information terminal devices are collected, and real space information is generated by learning by the server computer.

BACKGROUND ART

In recent years, there has been an increasing need for a service in which a plurality of moving or movable mobile devices equipped with various sensors collects sensor data acquired by the various sensors via a communication network, real space information is generated by integrally processing the collected sensor data with a server computer, such as, e.g., a cloud server computer, and the generated real space information is provided as knowledge.

The collection of sensor data acquired by a plurality of mobile devices equipped with sensors via a communication network as described above is called "Mobile Crowd Sensing", which is expected as a solution for various problems in society and industries (for example, see Non-Patent Documents 1 and 2).

Recently, as a sensor for acquiring large-capacity sensor data, a camera, a three-dimensional image sensor, and a three-dimensional radar are often used, and multimedia data configured by mixing an image, such as, e.g., a moving image and a static image, a three-dimensional image, and a sound has become included in the sensor data.

For example, it is conceivable to collect images, such as, e.g., static images and moving images, captured as sensor data by mobile devices equipped with cameras, and real space information (for example, the number of automobiles at each time in a plurality of spots) is generated by extracting objects (for example, license plates of automobiles) from the images.

PRIOR ART DOCUMENT

Non-Patent Document

Non-Patent Document 1: X. Wang, W. Wu, and D. Qi, "Mobility-Aware Participant Recruitment for Vehicle-based Mobile Crowdsensing", IEEE Transactions on Vehicular Technology, 2017

Non-Patent Document 2: Z. He, J. Cao, and X. Liu, "High quality participant recruitment in vehicle-based crowd-sourcing using predictable mobility", IEEE INFOCOM, pp. 2542-2550, 2015.

SUMMARY OF THE INVENTION

Problems to be Solved by the Invention

When a mobile device uploads sensor data, such as, e.g., an image, to a server computer, an uplink communication for a mobile communication is used, but its communication speed is slow, and the communication speed is even slower when the mobile device is moving.

For example, in a case where 100 units of mobile devices each send a 10 MB image every second, the transmission rate results in 8 Gbps. In the future, an omni-directional camera, a high-resolution camera, and a three-dimensional image sensor will be used, which will further increase the transmission rate.

For this problem, the sensor data transmitted from mobile devices to a server in real time must be limited, and it is difficult to accurately generate real space information from such limited sensor data.

The present invention has been made in view of the above-described problems, and aims to provide a learning-type real space information generation system capable of efficiently uploading sensor data from information terminal devices, such as, e.g., mobile devices, to a server, and thus capable of generating highly accurate real space information.

Means for Solving the Problem

To achieve the above-described object, the present invention is directed to a learning-type real space information generation system comprising:

a plurality of information terminal devices; and a server computer connected to the plurality of information terminal devices via a network in a communicable state, the server computer being configured to collect sensor data acquired by each of the plurality of information terminal devices and generate real space information by learning, wherein the information terminal device includes:

a data acquisition unit configured to acquire the sensor data of a real space:

a data holding unit configured to hold a plurality of sensor data acquired by the data acquisition unit;

a transmission unit configured to transmit the sensor data held by the data holding unit to the server computer via the network; and a control unit configured to control a transmission of the sensor data by the transmission unit, wherein the server computer includes:

a reception unit configured to receive the sensor data transmitted by the information terminal device via the network;

an extraction unit configured to extract elements configuring the real space information from the sensor data received by the reception unit;

a learning unit configured to generate a feature model of the real space information of a predetermined pattern by learning based on the elements configuring the real space information extracted by the extraction unit from past sensor data received by the reception unit;

an importance determination unit configured to determine importance of each element configuring the real space information in the feature model generated by the learning unit; and a generation unit configured to generate the real space information using the feature model based on the elements configuring the real space information extracted by the extraction unit from most recent sensor data received by the reception unit, wherein the control unit of the information terminal device controls the transmission unit to preferentially transmit the sensor data corresponding to the elements high in the importance configuring the real space information based on the importance of each element configuring the real space information determined by the importance determination unit of the server, for a plurality of sensor data stored in the data holding unit, and wherein the generation unit of the server computer generates the real space information using the feature model based on the elements high in the importance configuring the real space information extracted by the extraction unit from the most recent sensor data received by the reception unit.

Further, the control unit may control the transmission unit to transmit all the sensor data corresponding to the elements configuring the real space information when a communication environment is a high-speed communication environment and preferentially transmit the sensor data corresponding the elements high in the importance configuring the real space information when the communication environment is a low-speed communication environment.

Further, the control unit may control the transmission unit to transmit all the sensor data corresponding to the elements configuring the real space information when a stored energy of the information terminal device is equal to or greater than a predetermined value, and preferentially transmit the sensor data corresponding to the elements high in the importance configuring the real space information when the stored energy of the information terminal device is less than the predetermined value.

Further, the learning unit may generate a feature model of a pattern in which the elements configuring the real space information are arranged multidimensionally.

Further, the learning unit may generate a feature model of a pattern in which the elements configuring the real space information are arranged two dimensionally, the pattern being composed of any one of a combination of time information and spot information, time information and identification information, longitude information and latitude information, and spot information and word information.

Further, the importance determination unit may determine the importance of each element based on a change in a feature amount of each element configuring the real space information in the feature model of the real space information of a predetermined pattern.

Further, the present invention is directed to a learning-type real space information generation system comprising:

a plurality of information terminal devices; and a server computer connected to the plurality of information terminal devices via a network in a communicable state, the server computer being configured to collect sensor data acquired by each of the plurality of information terminal devices and generate real space information by learning, wherein the information terminal device includes:

a data acquisition unit configured to acquire the sensor data of a real space:

a data holding unit configured to hold a plurality of sensor data acquired by the data acquisition unit;

a transmission unit configured to transmit the sensor data held by the data holding unit to the server computer via the network; and a control unit configured to control a transmission of the sensor data by the transmission unit, wherein the server computer includes:

a reception unit configured to receive the sensor data transmitted by the information terminal device via the network;

an extraction unit configured to extract elements configuring the real space information from the sensor data received by the reception unit;

a learning unit configured to generate a feature model of the real space information of a predetermined pattern by learning based on the elements configuring the real space information extracted by the extraction unit from past sensor data received by the reception unit;

an importance determination unit configured to determine importance of each element configuring the real space information in the feature model generated by the learning unit; and a generation unit configured to generate the real space information using the feature model based on the elements configuring the real space information extracted by the extraction unit from most recent sensor data received by the reception unit, wherein the control unit of the information terminal device controls the data acquisition unit to preferentially acquire the sensor data corresponding to the element high in the importance configuring the real space information based on the importance of each element configuring the real space information determined by the importance determination unit of the server, and wherein the generation unit of the server computer generates the real space information using the feature model based on the elements high in the importance configuring the real space information extracted by the extraction unit from the most recent sensor data received by the reception unit.

Further, the control unit may control the data acquisition unit to acquire all the sensor data corresponding to the elements configuring the real space information when a communication environment is a high-speed communication environment and preferentially acquire sensor data corresponding the elements high in the importance configuring the real space information when the communication environment is a low-speed communication environment.

Further, the control unit may control the data acquisition unit to acquire all the sensor data corresponding to the elements configuring the real space information when a stored energy of the information terminal device is equal to or greater than a predetermined value, and preferentially acquire the sensor data corresponding to the elements high in the importance configuring the real space information when the stored energy of the information terminal device is less than the predetermined value.

Further, the present invention is directed to a learning-type real space information generation system comprising:

a plurality of information terminal devices; and a server computer connected to the plurality of information terminal devices via a network in a communicable state, the server computer being configured to collect sensor data acquired by each of the plurality of information terminal devices and generate real space information by learning, wherein the information terminal device includes:

a data acquisition unit configured to acquire the sensor data of a real space:

a data holding unit configured to hold a plurality of sensor data acquired by the data acquisition unit;

a transmission unit configured to transmit the sensor data held by the data holding unit to the server computer via the network; and a control unit configured to control a transmission of the sensor data by the transmission unit,

wherein the server computer includes:

a reception unit configured to receive the sensor data transmitted by the information terminal device via the network;

an extraction unit configured to extract elements configuring the real space information from the sensor data received by the reception unit;

a learning unit configured to generate a feature model of the real space information of a predetermined pattern by learning based on the elements configuring the real space information extracted by the extraction unit from past sensor data received by the reception unit;

an importance determination unit configured to determine importance of each element configuring the real space information in the feature model generated by the learning unit; and a generation unit configured to generate the real space information using the feature model based on the elements configuring the real space information extracted by the extraction unit from most recent sensor data received by the reception unit, wherein the control unit of the information terminal device controls a movement of the information terminal device to preferentially acquire the sensor data corresponding to the elements high in the importance configuring the rear space information by the data acquisition unit based on the importance of each element configuring the real space information determined by the importance determination unit of the server, and wherein the generation unit of the server computer generates the real space information using the feature model based on the elements high in the importance configuring the real space information extracted by the extraction unit from the most recent sensor data received by the reception unit.

Further, the control unit may control the movement of the information terminal device so that the data acquisition unit acquires all the sensor data corresponding to the elements configuring the real space information when a communication environment is a high-speed communication environment and the data acquisition unit preferentially acquires the sensor data corresponding the elements high in the importance configuring the real space information when the communication environment is a low-speed communication environment.

The control unit may control the movement of the information terminal device so that the data acquisition unit acquires all the sensor data corresponding to the elements configuring the real space information when a stored energy of the information terminal device is equal to or greater than a predetermined value and the data acquisition unit preferentially transmit the sensor data corresponding to the elements high in the importance configuring the real space information when the stored energy of the information terminal device is less than the predetermined value.

Effects of the Invention

According to the present invention, the information terminal device preferentially transmits the sensor data corresponding to the elements configuring the real space information high in the importance, and therefore, it is possible to efficiently upload the sensor data from the information terminal device to the server computer. For this reason, the real space information can be generated quickly, and highly accurate real space information can be generated with only a part of the data.

Further, in the case of providing a real space information service in real time, the data traffic that must be transmitted from the information terminal device to achieve a certain degree of accuracy can be reduced.

Further, the communication traffic volume of the sensor data transmitted from the information terminal device is reduced. Therefore, the communication charge required for the information terminal device to transmit the sensor data can be reduced, and the battery consumption of the information terminal device can be reduced to provide a long service life.

BRIEF DESCRIPTION OF THE DRAWINGS

FIG. 5 is a diagram showing one example of a feature model of real space information.

FIG. 14 is a diagram showing another example of a feature model of real space information.

EMBODIMENTS FOR CARRYING OUT THE INVENTION

Embodiment 1

Next, with reference to FIG. 1 to FIG. 7, a first embodiment of a learning-type real space information generation system (hereinafter referred to as "this system") according to the present invention will be described.

[Overall Configuration]

Figure 1:
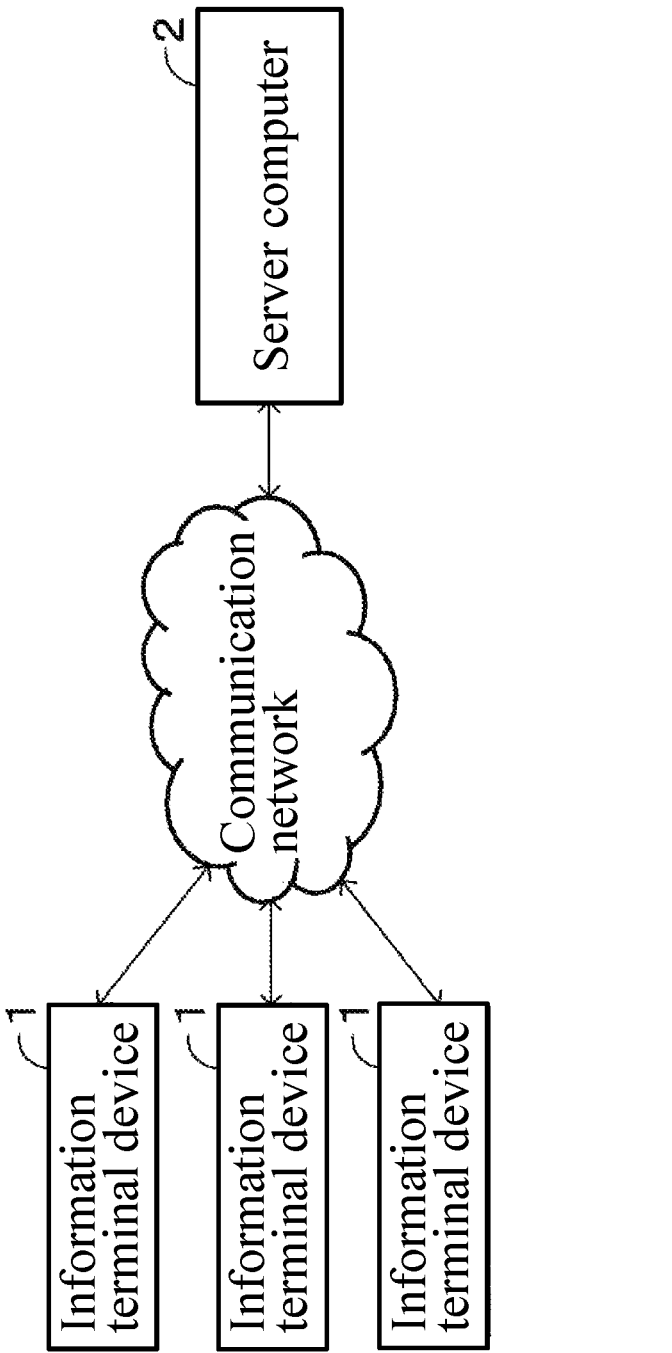
FIG. 1 is a diagram showing an entire configuration of a learning-type real space information generation system according to a first embodiment of the present invention.

In this system, as shown in FIG. 1, a plurality of information terminal devices 1 and a server computer (hereinafter, referred to as "server 2") are connected to each other in a communicable state via the network, and sensor data acquired in each information terminal device 1 is collected to generate real space information in the server 2 by learning.

As the sensor data, any data capable of being acquired by sensors in real space may be exemplified. For example, such sensor data includes: multimedia data configured by a mixture of image data, such as, e.g., a static image and a moving image, three-dimensional image sensor data, sound data, an image or a sound of an image, such as, e.g., a moving image and a static image; weather data relating to precipitation, snowfalls, wind directions, wind speeds, and wave heights; geography data relating to ground temperatures and underground components; and earthquake data relating to seismic intensity.

Figure 4:
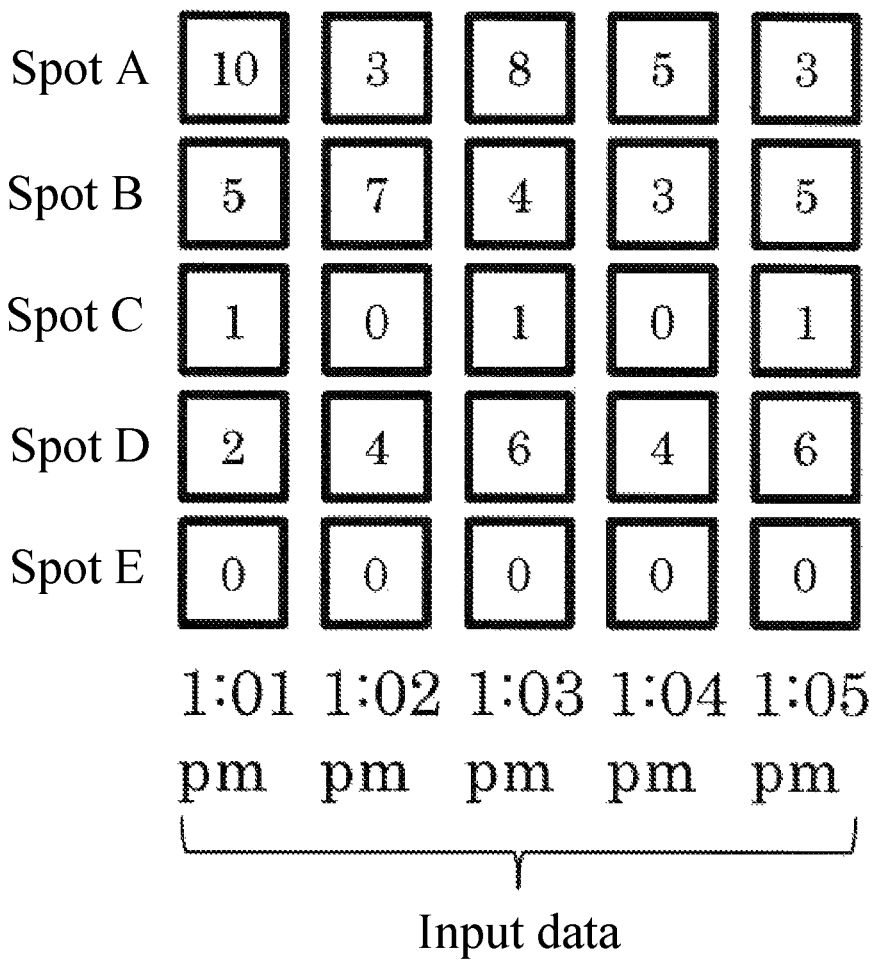
FIG. 4 is a diagram showing one example of real space information.

Further, the real space information denotes information relating to existing real space relating to the environment or social life. An example of the real space information can be exemplified as follows. As shown in FIG. 4, it is arranged in a two-dimensional format of time information and spot information, and the traffic volume (the number of vehicles) at each time in each spot is configured as elements relating to the real space information.

The elements configuring the real space information are extracted from the sensor data acquired by the information terminal device 1. For example, in a case where the sensor data is image data relating to traffic photographed by a camera of each information terminal device 1, license plates in the image data are recognized, so that the traffic volume (the number of vehicles) is extracted as the element configuring the real space information.

Further, when acquiring the sensor data by the information terminal device 1, for example, each information terminal device 1 acquires sensor data (image) at each time at the respective spots A, B, C, D, and E by fixed-point observation, or, each information terminal device 1 acquires sensor data (image) at each time while moving between the spots A, B, C, D, and E.

[Configuration of Information Terminal Device 1]

The information terminal device 1 includes a mobile device carried by a user, such as, e.g., a smartphone, a mobile phone terminal, a tablet terminal, and smart glasses, and other devices including, for example, a drive recorder installed on an automobile, a drone, a security camera device or a traffic camera device set on roads, a three-dimensional image sensor device, and various radar devices. Each of the sensors installed in each device acquires sensor data in real space and transmits the sensor data to the server 2 via the network.

Figure 2:
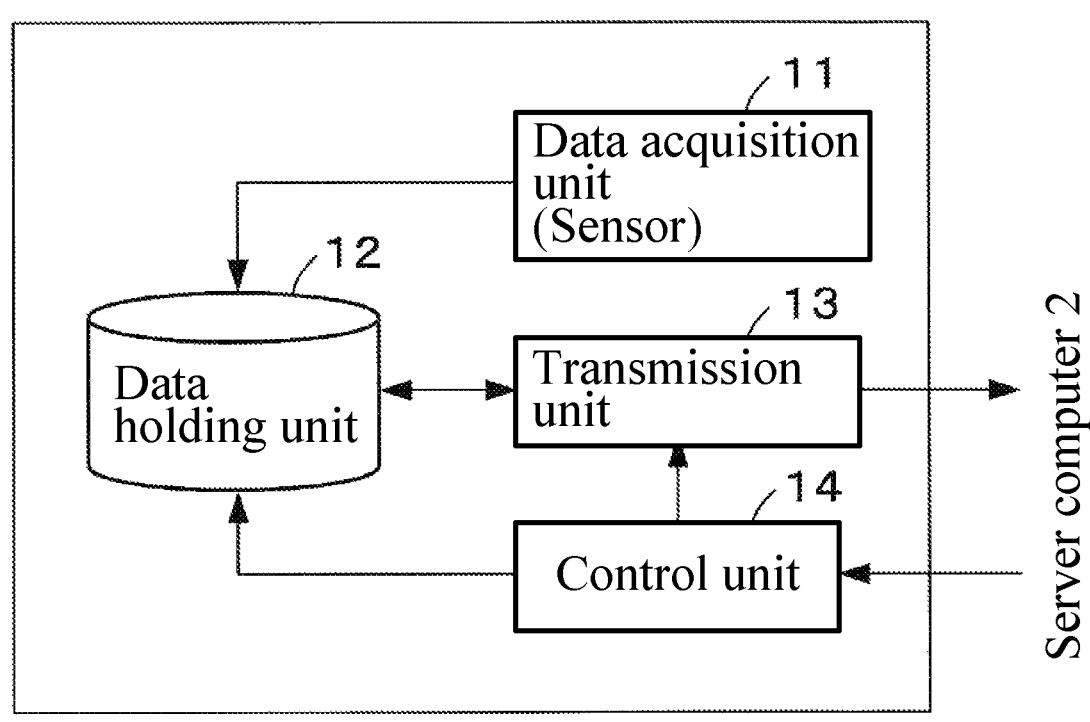
FIG. 2 is a block diagram showing a configuration of an information terminal device of FIG. 1.

Specifically, the information terminal device 1, as shown in FIG. 2, is provided with a data acquisition unit 11 (sensor) for acquiring sensor data, a data holding unit 12 for holding the sensor data, a transmission unit 13 for transmitting the sensor data, and a control unit 14 for controlling the transmission unit 13.

The data acquisition unit 11 is, for example, a camera, a microphone, or other various sensors for acquiring sensor data in real space. When acquiring the sensor data, the sensor data may be acquired directly, or the sensor data may be acquired through a network.

The data holding unit 12 is configured to hold the sensor data of the real space acquired by the data acquisition unit 11 temporarily or for the long-term.

The transmission unit 13 is configured to transmit the sensor data of the real space held by the data holding unit 12 to the server 2 via the network. In this transmission unit 13, the transmission of the sensor data is controlled by the control unit 14 as will be described later.

The control unit 14 controls the transmission unit 13 to transmit the sensor data of the real space held by the data holding unit 12 to the server 2 via the network.

Specifically, in the case of generating a feature model of the real space information by learning in the server 2, the control unit 14 controls the transmission unit 13 to transmit all the sensor data held by the data holding unit 12 to the server 2 via the network.

Further, in the case of generating future real space information using the feature model of the real space information in the server 2, the control unit 14 preferentially transmits sensor data high in the importance among a plurality of sensor data held by the data holding unit 12. Specifically, the control unit performs as follows (1) to (3).

(1) The importance of elements configuring the real space information is transmitted from the server 2 via the network (the method of determining the importance of the element configuring the real space information in the server 2 will be explained later).

(2) The control unit 14 determines the importance of each sensor data corresponding to the element configuring the real space information based on the importance of each element configuring the real space information for the sensor data held in the data holding unit 12.

(3) The control unit 14 controls the transmission unit 13 to preferentially transmit the sensor data high in the importance.

In this embodiment, the control unit 14 controls the transmission unit 13 to transmit all the untransmitted sensor data held by the data holding unit 12 when the communication environment is a high-speed communication environment (when the communication speed in the communication environment is equal to or high than a predetermined value). While the control unit 14 controls the transmission unit 13 to preferentially transmit sensor data high in the importance among the sensor data held by the data holding unit 12 when the communication environment is a low-speed communication environment (the communication speed in the communication environment is less than the predetermined value). Note that the high-speed communication environment denotes, for example, not a moving environment but an environment in which a fixed communication, such as, e.g., a LAN and a millimeter-wave communication, is available.

The control unit 14 may control the transmission unit 13 such that the sensor data high in the importance held in the data holding unit 12 is transmitted in real-time or that the sensor data high in the importance held in the data holding unit 12 for a certain period is transmitted collectively.

Further, as a method for transmitting the sensor data high in the importance by the control unit 14, methods may be exemplified in which sensor data high in the importance is preferentially transmitted in a wide frequency band, the transmission probability of the sensor data high in the importance is set, or transmission power of the sensor data high in the importance is preferentially assigned.

Further, the control unit 14 may perform processing (compression, resolution change, etc.) for lightening the sensor data high in the importance using the calculation processing capability and the power of the information terminal device 1,

[Configuration of Server 2]

The server 2 is a server computer, such as, e.g., a cloud server computer, and generates real space information by integrally processing the sensor data transmitted from the information terminal device 1 and provides the generated real space information as knowledge.

Figure 3:
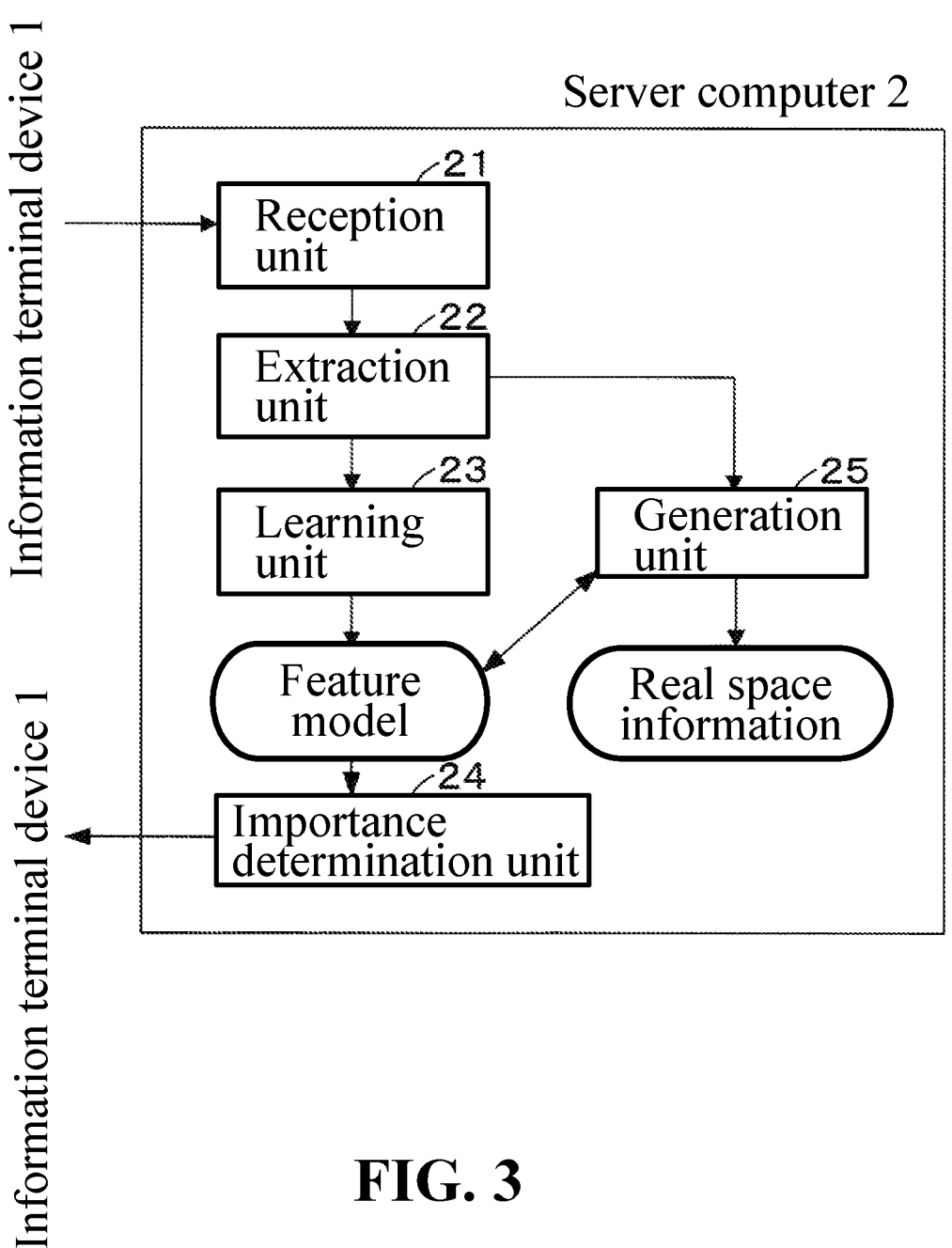
FIG. 3 is a block diagram showing a configuration of a server computer of FIG. 1.

Specifically, as shown in FIG. 3, the server 2 is equipped with a reception unit 21 for receiving sensor data of the real space, an extraction unit 22 for extracting elements configuring the real space information from the sensor data, a learning unit 23 for generating a feature model of the real space information of a predetermined pattern by learning, an importance determination unit 24 for determining the importance of each element configuring the real space information, and a generation unit 25 for generating future real space information.

The reception unit 21 is configured to receive the sensor data of the real space transmitted by the information terminal device 1 via the network.

The extraction unit 22 is configured to extract the elements configuring the real space information from the sensor data received by the reception unit 21. For example, as shown in FIG. 4, in a case where the real space information is arranged in a two-dimensional format of time information and spot information, the extraction unit 22 extracts the traffic volume (the number of vehicles) at each time in each spot as the elements relating to the real space information.

The learning unit 23 is configured to generate, based on the elements configuring the real space information extracted by the extraction unit 22 from prior sensor data received by the reception unit 21, a feature model of the real space information of a predetermined pattern by learning.

This feature model represents the correspondence between the past real space information and the prediction result (ground truth) of the real space information, and is used in generating future real space information by the generation unit 25 as will be described later.

For example, as shown in FIG. 4, in a case where the real space information is arranged in a two-dimensional format of time information and spot information, a case will be considered in which the element configuring the real space information is a traffic volume (the number of vehicles) at each time in each spot.

Figure 5:
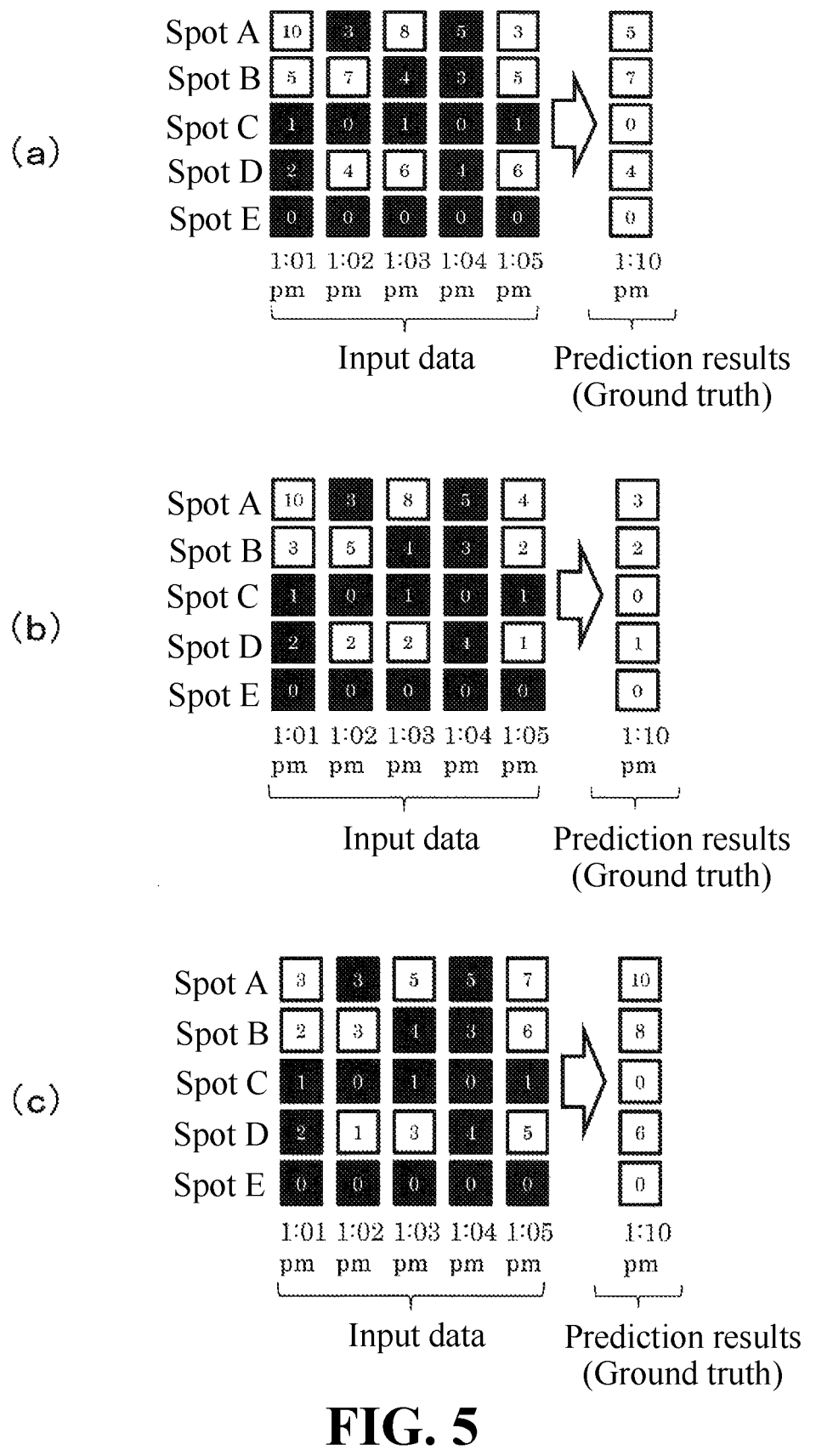

FIG. 5 is a record of last three days in which past real space information is generated by inputting sensor data of the past five minutes from 1:01 to 1:05 at each spot A to E. At the time of learning, a prediction result (ground truth) of the traffic volume (the number of vehicles) five minutes after 1:10 at each spots A to E is given. The correspondence between the past real space information and the prediction result of the real space information (ground truth) is expressed as a feature model.

The importance determination unit 24 determines the importance of each element configuring the real space information in the feature model of the real space information. The importance of each element configuring the real space information is transmitted to the information terminal device 1 via the network.

For example, in the case of the feature model of the real space information shown in FIG. 5, the feature amounts (the number of vehicles) of the white elements vary from day to day, but the feature amounts (the number of vehicles) of the black elements do not vary from day to day. That means that the white elements are important for predicting the traffic volume at the time 1:10 at each spot and the black elements are not important. From this, the importance determination unit 24 determines such that the importance of the white elements is high and the importance of the black elements is low.

In this manner, by determining the importance of each element configuring the real space information, when generating the future space information in the generation unit 25 as will be described later, the feature amount of the elements can be used as it is for the elements low in the importance, while the feature amount of the elements extracted from new sensor data can be used for the elements high in the importance.

The generation unit 25 generates future real space information using the feature model of the real space information based on the elements configuring the real space information extracted by the extraction unit 22 from the sensor data of the real space most recently received by the reception unit 21.

In this embodiment, when the communication environment is a high-speed communication environment, all the most recent sensor data is received by the reception unit 21. Therefore, the future real space information is generated using the feature model of the real space information based on the elements configuring the real space information extracted by the extraction unit 22 from all of the most recent sensor data.

Also, when the communication environment is a low-speed communication environment, the most recent sensor data high in the importance is received by the reception unit 21. Therefore, future real space information is generated using the feature model of the real space information based on the elements high in the importance configuring the real space information extracted by the extraction unit 22 from the most recent sensor data high in the importance.

For example, in the case of the feature model of the real space information as shown in FIG. 5, only the sensor data corresponding to the elements high in the importance (white) configuring the real space information is received by the reception unit 21 in the server 2 among the sensor data in the most recent five minutes between 1:01 to 1:05 at each spot A to E acquired by the information terminal device 21. For this reason, the feature amount of the elements high in the importance (white) configuring the real space information is extracted by the extraction unit 22.

On the other hand, among the most recent sensor data in five minutes between the latest time 1:01 to 1:05 at each spot A to E acquired by the information terminal device 1, the sensor data corresponding to the elements (black) low in the importance configuring the real space information is not received by the reception unit 21 in the server 2. However, the feature amount of the elements (black) low in the importance is maintained in the feature model.

Therefore, by combining the feature amount of the elements (white) high in the importance configuring newly extracted real space information and the feature amount of the elements (black) low in the importance configuring the already held real space information, it is possible to generate future real space information with high accuracy by using the feature model of the learned real space information.

[Flow at the Time of Learning Real Space Information]

Figure 6:
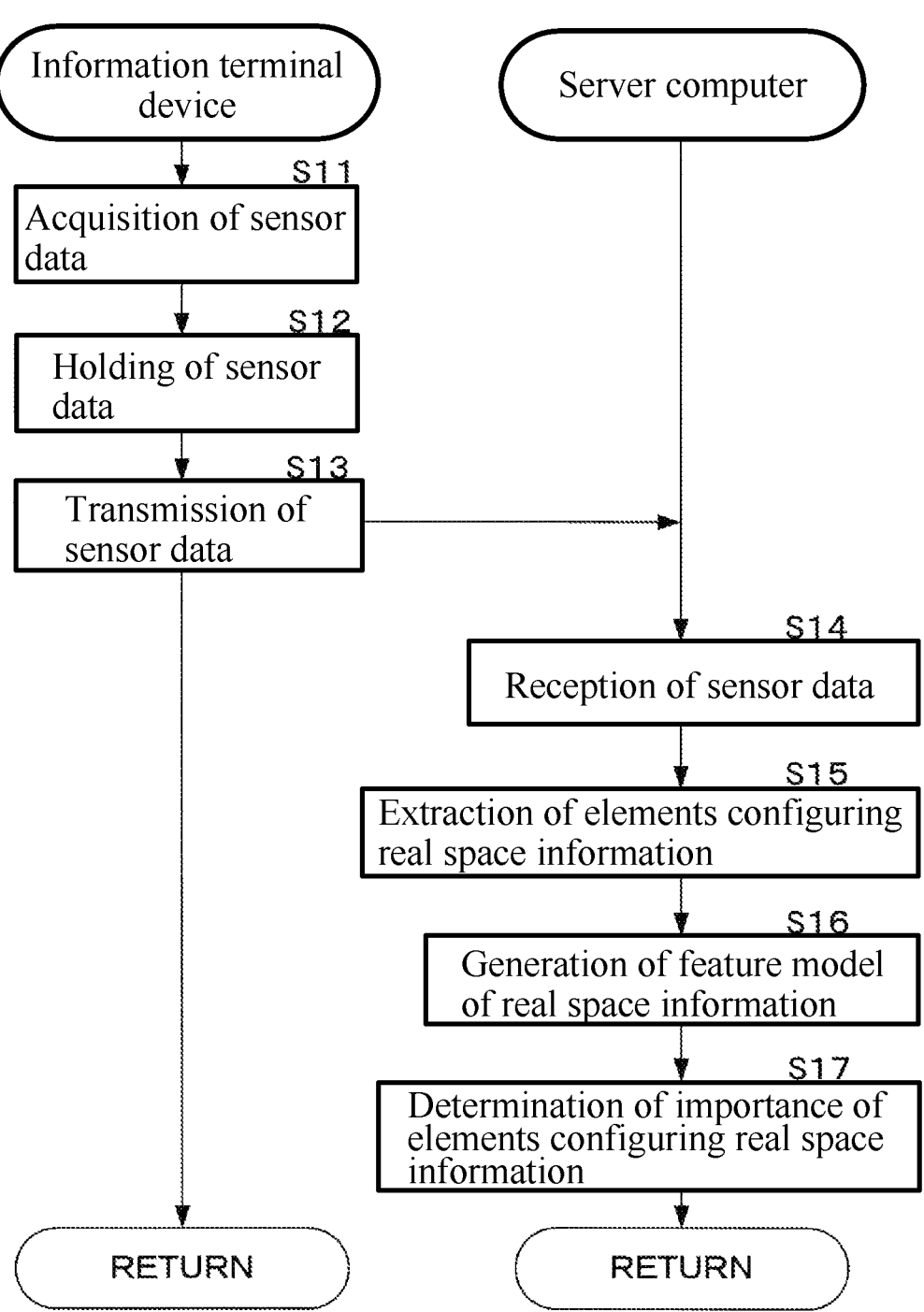
FIG. 6 is a diagram showing a flowchart at the time of learning real space information.

Next, with reference to the flowchart shown in FIG. 6, the flow at the time of learning the real space information in this system will be described.

The information terminal device 1 transmits all the acquired sensor data of the real space information to the server 2 via the network. The specific flow is as follows.

The data acquisition unit 11 (sensor) acquires sensor data required in real space (Step S11).

Then, the data holding unit 12 holds the sensor data of the real space acquired by the data acquisition unit 11 (Step S12).

The transmission unit 13 transmits all of the past sensor data of the real space held by the data holding unit 12 to the server 2 via the network based on the instruction of the control unit 14 (Step S13).

Next, the server 2 extracts the elements configuring the real space information from the sensor data of the real space transmitted from the information terminal device 1, thereafter generates a feature model of the real space information of a predetermined pattern and determines the importance of the element configuring the real space information. The specific flow is as follows.

The reception unit 21 receives the sensor data of the real space transmitted by the information terminal device 1 via the network (Step S14).

Then, the extraction unit 22 extracts the elements configuring the real space information from the sensor data received by the reception unit 21 (Step S15).

The learning unit 23 generates a feature model of a predetermined pattern by learning based on the elements configuring the real space information extracted by the extraction unit 22 from past data received by the reception unit 21 (Step S16). The feature model of the real space information is, for example, as shown in FIG. 5.

Then, the importance determination unit 24 determines the importance of each element configuring the real space information in the feature model of the real space information (Step S17). For the determination of the importance of each element configuring the real space information, for example, as shown in FIG. 5, the importance is set high for the white element configuring the real space information, and the importance is set low for the black element. Note that the importance of each element configuring the real space information is transmitted to the information terminal device 1 via the network.

[Flow at the Time of Predicting Real Space Information]

Figure 7:
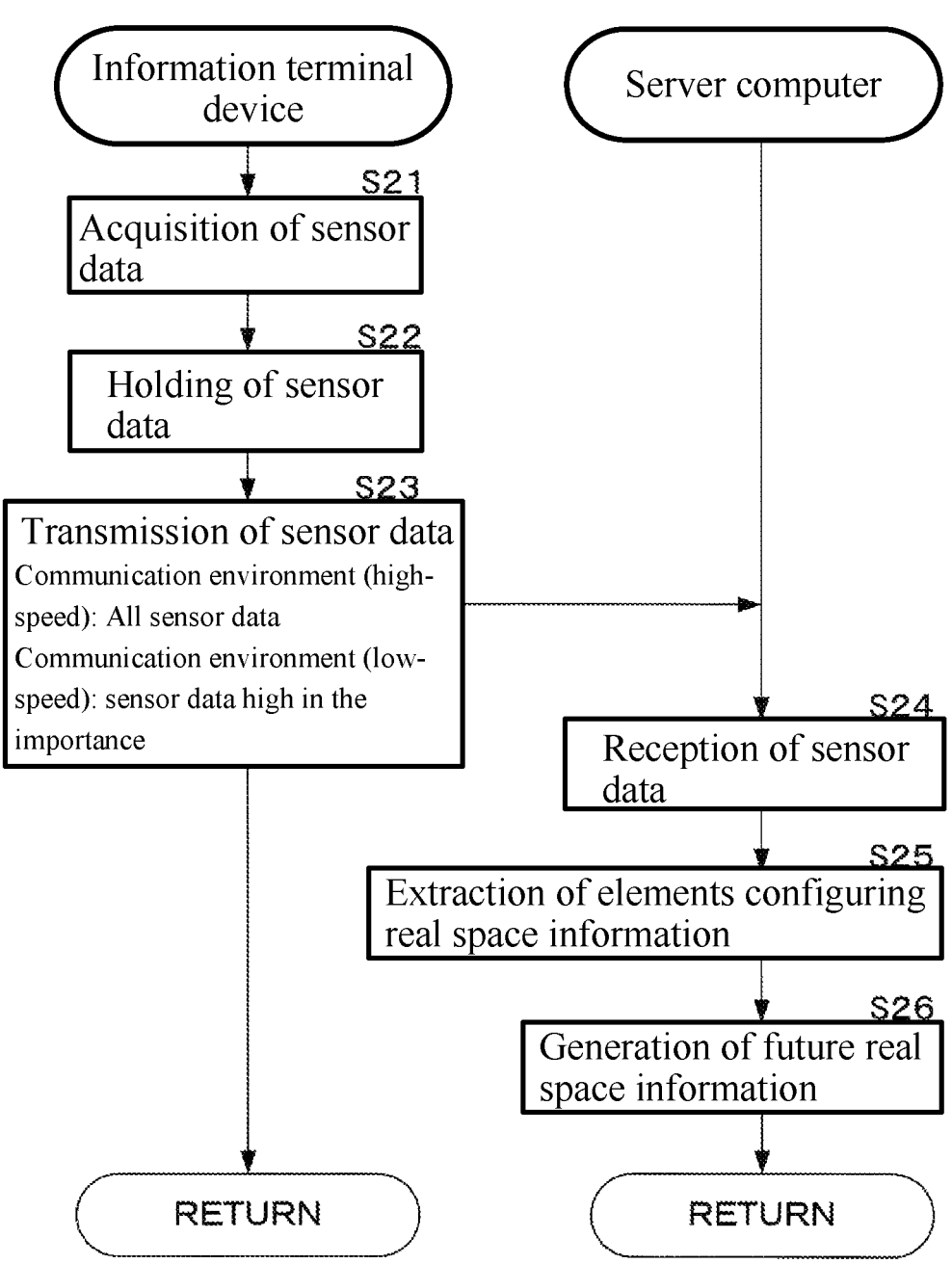
FIG. 7 is a diagram showing a flowchart at the time of predicting real space information.

Next, the flow at the time of predicting real space information in this system will be described with reference to the flowchart shown in FIG. 7.

The information terminal device 1 transmits the sensor data high in the importance among the acquired sensor data of the real space information to the server 2 via the network. The specific flow is as follows.

The data acquisition unit 11 (sensor) acquires sensor data required in real space (Step S21).

The data holding unit 12 holds the sensor data acquired by the data acquisition unit 11 (Step S22). At this time, the data holding unit 12 holds all the sensor data acquired by the data acquisition unit 11.

Then, the transmission unit 13 transmits the most recent sensor data of the real space held in the data holding unit 12 based on the instruction of the control unit 14 (Step S23). Specifically, the transmission unit 13 transmits all the most recent data held in the holding unit 12 when the communication environment is a high-speed communication environment, and preferentially transmits the sensor data high in the importance among the most recent sensor data of the real space held by the data holding unit 12 when the communication environment is a low-speed communication environment.

Next, the server 2 extracts the elements configuring the real space information from the sensor data of the real space transmitted from the information terminal device 1, and thereafter generates future real space information using the feature model of the real space information. The specific flow is as follows.

The reception unit 21 receives the sensor data of the real space transmitted from the information terminal device 1 via the network (Step S24).

Then, the extraction unit 22 extracts the elements configuring the real space information from the sensor data received by the reception unit 21 (Step S25).

The generation unit 25 then generates future space information using the feature model of the real space information based on the elements configuring the real space information extracted by the extraction unit 22 from the most recent sensor data of the real space received by the reception unit 21 (Step S26).

In this embodiment, when the communication environment is a high-speed communication environment, all the most recent sensor data is received by the reception unit 21. Therefore, future real space information is generated using the feature model of the real space information based on the elements configuring the real space information extracted by the extraction unit 22 from all the most recent sensor data.

On the other hand, when the communication environment is a low-speed communication environment, the most recent sensor data high in the importance is received by the reception unit 21. Therefore, future real space information is generated using the feature model of the real space information based on the elements high in the importance configuring the real space information extracted by the extraction unit 22 among the most recent sensor data high in the importance. For example, as shown in FIG. 5, by combining the feature amount of the important elements (white) configuring the newly extracted real space information and the feature amount of the already held non-important elements (black) configuring the real space information, it is possible to accurately generate future real space information by using the feature model of the learned real space information.

Note that, in this embodiment, the control unit 14 of the information terminal device 1 is configured to control such that when the communication environment is a high-speed communication environment, all the untransmitted sensor data held by the data holding unit 12 is transmitted, and when the communication environment is a low-speed communication environment, the sensor data high in the importance among the sensor data held by the data holding unit 12 is preferentially transmitted. However, the control unit 14 may control the transmission unit 13 to preferentially transmit the sensor data high in the importance among the sensor data held by the data holding unit 12 regardless of the communication environment status. However, when generating the feature model of the real space information in the learning unit 23 of the server 2, the more there is the sensor data, the more the accuracy of the feature model is improved. Therefore, it is preferable to transmit all the sensor data to the server 2 eventually.

Further, the control unit 14 of the information terminal device 1 may control the transmission unit 13 such that when the stored energy of the information terminal device is equal to or greater than a predetermined value, all the untransmitted sensor data held by the data holding unit 12 is transmitted, and when the stored energy of the information terminal device is less than the predetermined value, the sensor data high in the importance among the sensor data held by the data holding unit 12 is preferentially transmitted.

Example

This system was verified using actual sensor data. The specifications were as follows.

Data Set: CRAWDAD Sab Francisco Cabs (https://craw-dad.org/)
   Evaluation Indicators: RMSLE (Root Mean Squared Log Error)
   Document of Evaluation Indicators: M. Zeng, T. Yu, X. Wang, V. Su, L. T. Nguyen, and O. J. Mengshoel, "Improving Demand Prediction in Bike Sharing System by Learning Global Features," Machine Learning for Large Scale Transportation Systems (LSTS), 2016.
   Machine learning method: Random Forest Past data used for prediction: Every 1 minute before 30 minutes Prediction target: 1 minute later Spot size: 1 km²

Figure 8:
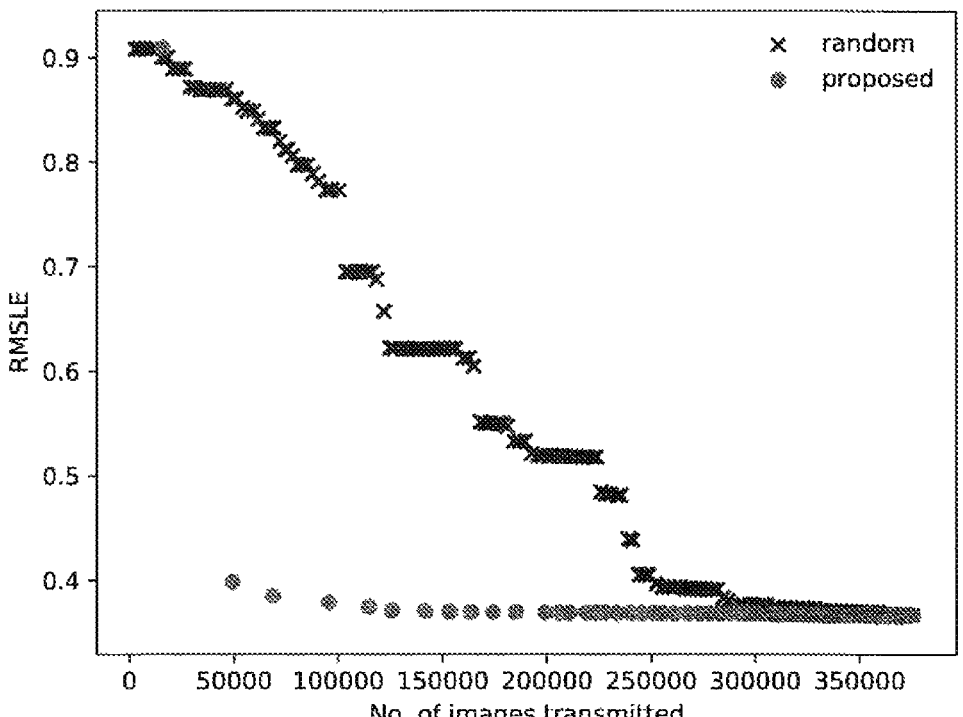
FIG. 8 is a diagram showing experimental results predicting the number of vehicles at each spot.

As a result of predicting the number of vehicles at each spot, as shown in FIG. 8, in a case where sensor data was transmitted uniformly, and some sensor data was arrived at the server 2 randomly, the error became large when the number of images was small, and the error became small only when the number of images became 250,000 or more. On the other hand, in a case where the sensor data high in the importance was transmitted, it was confirmed that the error was small even when the number of images was small.

Figure 9:
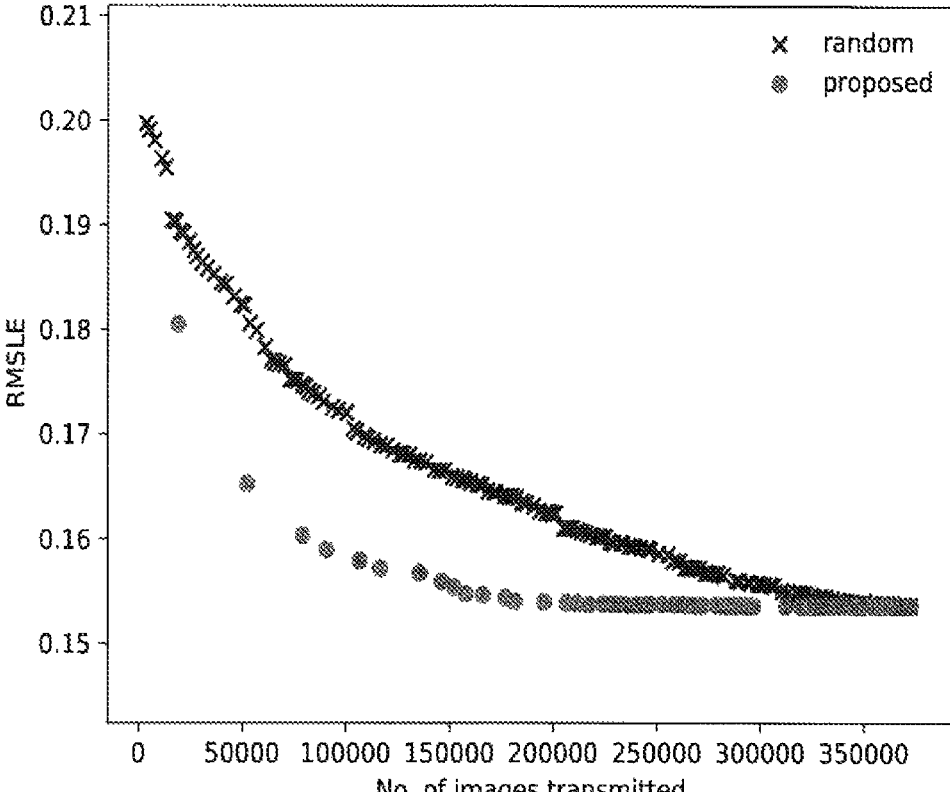
FIG. 9 is a diagram showing experimental results predicting the number of persons in vehicles at each spot.

Further, as a result of predicting the number of persons in taxis at each spot, as shown in FIG. 9, in a case where the sensor data was transmitted uniformly, and some sensor data was arrived at the server 2 randomly, the error became large when the number of images was small, and the error became small only when the number of images became 250,000 or more. On the other hand, in a case where the sensor data high in the importance was transmitted, it was confirmed that the error was small even when the number of images was around 100,000.

Embodiment 2

Next, with reference to FIG. 10, a second embodiment of this system will be described. In the following description, only the configuration differing from the above embodiment will be described, and the same configuration will be denoted by the same reference numeral by omitting the description.

Figure 10:
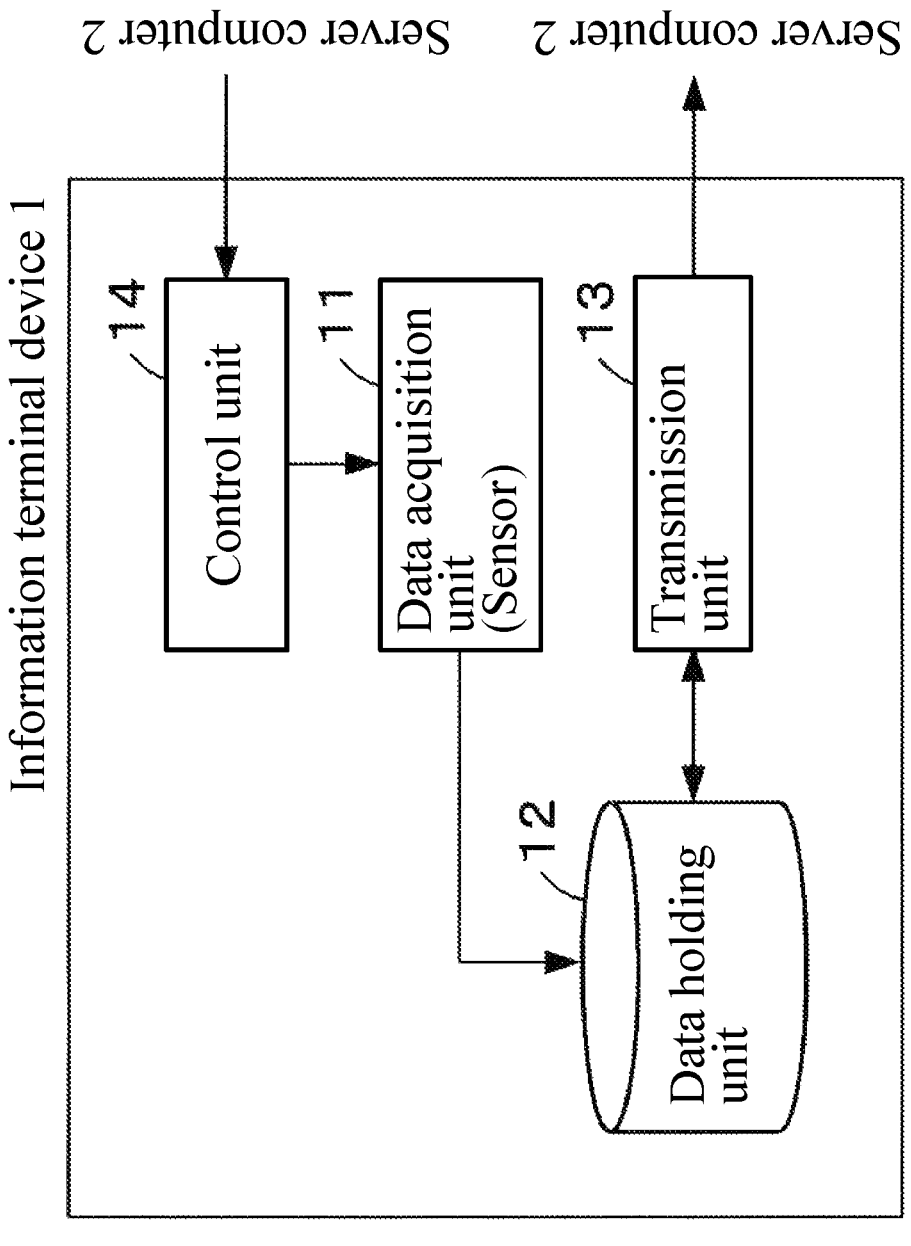
FIG. 10 is a block diagram showing a configuration of an information terminal device according to a second embodiment of the present invention.

In this embodiment, as shown in FIG. 10, the control unit 14 of the information terminal device 1 controls the data acquisition unit 11 to preferentially acquire the sensor data corresponding to the elements high in the importance configuring the real space information based on the importance of each element configuring the real space information determined by the importance determination unit 24 of the server 2.

For example, in the case of the real space information as shown in FIG. 4, when the information terminal device 1 has reached the spot and the time corresponding to the elements high in the importance configuring the real space information, the data acquisition unit 11 of the information terminal device 1 acquires sensor data at the spot and the time. In the same manner as in the first embodiment, the sensor data high in the importance is transmitted by the transmission unit 13 to the server 2 via the network and is used in the server 2 to generate future real space information.

Further, the control unit 14 of the information terminal device 1 may control the data acquisition unit 11 to acquire all the sensor data corresponding to the elements configuring the real space information when the communication environment is a high-speed communication environment and preferentially acquire the sensor data corresponding to the elements high in the importance configuring the real space information when the communication environment is a low-speed communication environment.

Further, the information terminal device 1 of the control unit 14 may control the data acquisition unit 11 to acquire all the sensor data corresponding to the element configuring the real space information when the stored energy of the information terminal device 1 is equal to or greater than a predetermined value and preferentially acquire the sensor data corresponding to the elements high in the importance configuring the real space information when the stored energy of the information terminal device 1 is less than the predetermined value

Embodiment 3

Next, with reference to FIG. 11, a third embodiment of the present system will be described. In the following description, only the configuration differing from the above embodiment will be described, and the same configuration will be denoted by the same reference numerals by omitting the description.

Figure 11:
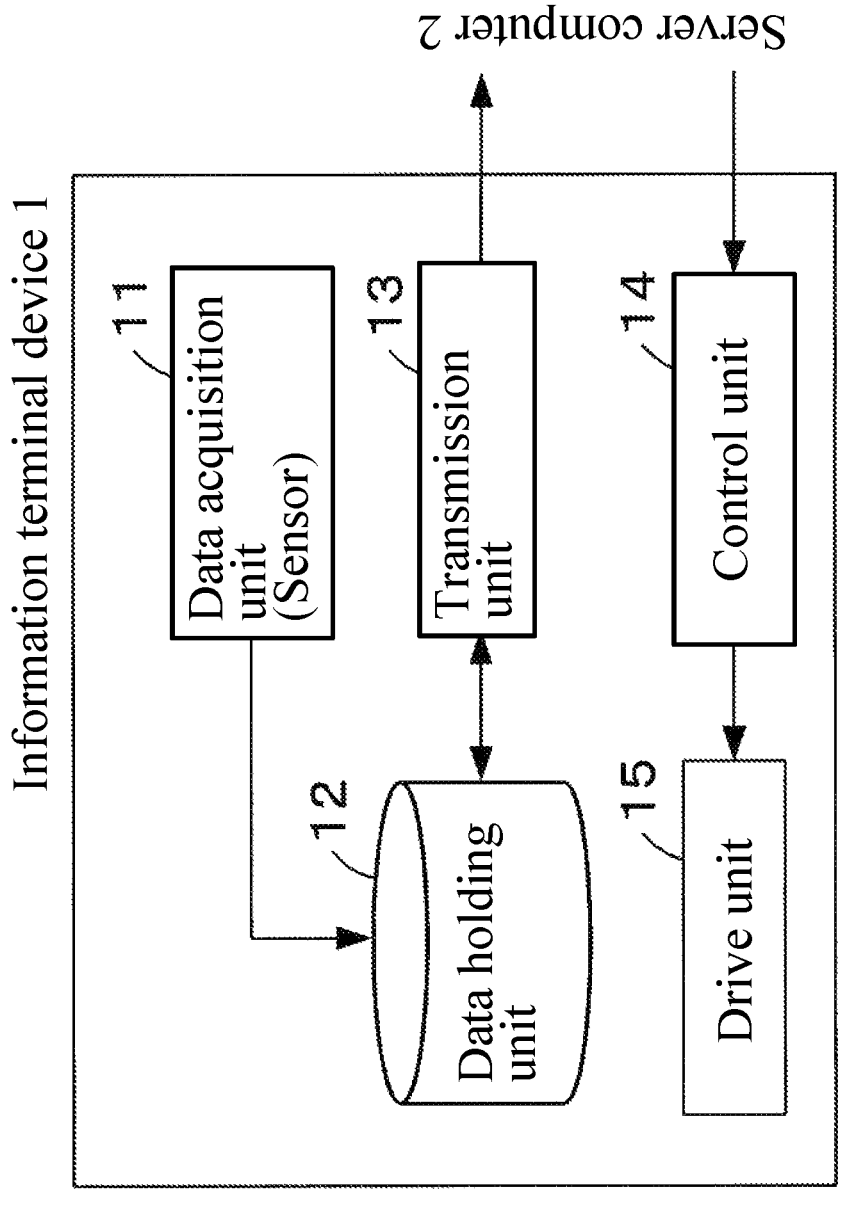
FIG. 11 is a block diagram showing a configuration of an information terminal device according to a third embodiment of the present invention.

In this embodiment, as shown in FIG. 11, the control unit 14 of the information terminal device 1 controls the movement of the information terminal device 1 to preferentially acquire the sensor data corresponding to the elements high in the importance configuring the real space information by the data acquisition unit 11 based on the importance of each element configuring the real space information determined by the importance determination unit 24 of the server 2.

For example, in a case where the information terminal device 1 is a drone, in the case of the real space information as shown in FIG. 4, the information terminal device 1 controls the flight travel (drive unit 15) of the information terminal device 1 such that the information terminal device 1 preferentially reaches the spot and the time corresponding to the elements high in the importance configuring the real space information. The sensor data high in the importance is transmitted by the transmission unit 13 to the server 2 via the network 2 and is used in the server 2 to generate future real space information.

In the above-described embodiments, as an example of the real space information, in a case in which the real space information is arranged in a two-dimensional format of time information and spot information, the traffic volume (the number of vehicles) has been exemplified as an example of the elements configuring the real space information. However, the present invention is not limited to the above-described real space information. For example, the following real space information may be considered.

The control unit 14 of the information terminal device 1 may control the movement of the information terminal device 1 such that when the communication environment is a high-speed communication environment, all the sensor data corresponding to the elements configuring the real space information is acquired by the data acquisition unit 11, and when the communication environment is a low-speed communication environment, the sensor data corresponding to the element high in the importance configuring the real space information is acquired by the data acquisition unit 11.

Further, the control unit 14 of the information terminal device 1 may control the information terminal device 1 such that that in a case where the stored energy of the information terminal device 1 is equal to or larger than a predetermined value, all the sensor data corresponding to the elements configuring the real space information is acquired by the data acquisition unit 11, and in a case where the stored energy of the information terminal device 1 is less than the predetermined value, the sensor data corresponding to the elements high in the importance configuring the real space information is preferentially acquired by the data acquisition unit 11.

Real Space Information Example 1

In a case where the real space information is arranged in a two-dimensional format of time information and spot information as shown in FIG. 4, the elements configuring the real space information and its expected effects may be considered as shown in the following Table 1.

TABLE 1

| Element Configuring Real Space Information | Expected results |
| --- | --- |
| Traffic volume | Congestion relief |
| Vehicle maximum speed | Accident prevention, danger avoidance |
| Average vehicle-to-vehicle distance | Accident prevention, danger avoidance |
| Number of passengers of taxi and bus | Vehicle allocation optimization, timetable optimization |
| Number of visitors other than residents in the area | Crime prevention |
| Amount of air pollutants | Environmental protection, health management |
| Noise | Improvement of the living environment, improvement of security |
| Communication speed | Service improvement of telecommunication carriers |
| Radio strength | Service improvement of telecommunication carriers |
| Number of crimes | Prevention of crime, early detection |

Real Space Information Example 2

Figure 12:
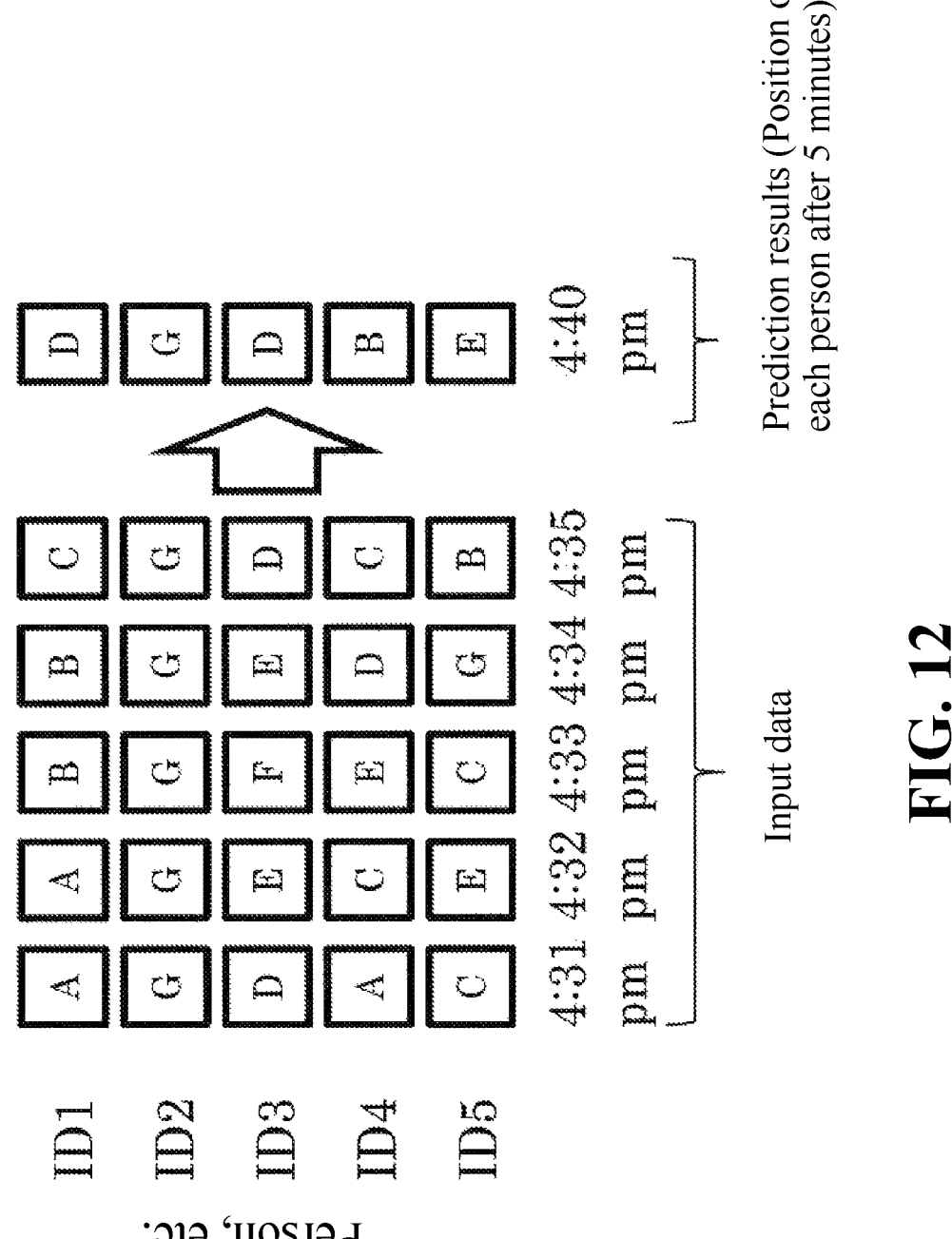
FIG. 12 is a diagram showing another example of a feature model of real space information.

In a case where the real space information is arranged in a two-dimensional format of time information and identification information (ID) as shown in FIG. 12, the spot at each time for each person can be extracted to predict the spot of each person at the future time. Note that in a case where the real space information is arranged in a two-dimensional format of time information and identification information (ID), as shown in Table 2 below, the element configuring the real space information and its expected effects can be expected.

TABLE 2

| Element Configuring Real Space Information | Expected results |
| --- | --- |
| Position of each person | Improvement of the consumer convenience in commercial facilities |
| Position of the individual bus or train | Improvement of the convenience of transportation |

Real Space Information 3

Figure 13:
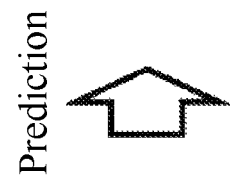
FIG. 13 is a diagram showing another example of a feature model of real space information.

In a case where the real space information is placed in the two-dimensional format of longitude information and latitude information as shown in FIG. 13, the distribution of sky cloud at each spot in time t+1 can be predicted by extracting the distribution of the sky cloud collected at the time t−1 at each spot, for example. Note that in a case where the two-dimensional format of longitude information and latitude information is used, as shown in the following Table 3, elements of the configuration of the real space information and its expected effects are considered.

TABLE 3

| Element Configuring Real Space Information | Expected results |
| --- | --- |
| Image of cloud distribution in the sky | Weather forecast |

TABLE 3-continued

| Element Configuring Real Space Information | Expected results |
| --- | --- |
| Image of frozen road surface | Attention to drivers and pedestrians |
| Image of littered garbage | Beautification, environmental protection |

Real Space Information Example 4

In a case where the real space information is arranged in a two-dimensional format of spot information and integrated information as shown in FIG. 14, the crime rate at a time t+1 at each spot can be predicted by, for example, extracting words from the sound data collected at the time t−1 at each spot and extracting objects from the collected image data.

Further, the importance determination unit 24 of the server 2 determines that the elements configuring the real space information having a change in the feature amount in the feature model of the real space information are the elements high in the importance. However, but it may be determined that the elements are high in the importance when the feature amount of the element has exceeded a predetermined threshold or may determine the importance of elements by the specific numerical value.

Further, the method for determining the importance of the elements configuring the real space information is not limited to the above-described method (the feature amount selection), and other methods, such as, e.g., an importance determination using "LSTM (Long Short-Term Memory", an importance determination using "CNN (Convolutional Neural Network), an importance determination using "Random Forest", and the like, may be used.

The above-described LSTM, CNN and Random Forest are generally included in mechanical learning (Machine Learning). In a case where the importance determination is performed by using them, the importance of the elements configuring the real space information may be extracted as a numerical value by using the feature selection method (Feature Selection) called Perturb scheme. As another feature selection method, there is a weights system and an impurity system. The weights system can be applied to a Neural Network system machine learning, such as, e.g., an LSTM and a CNN, and the impurity system can be applied to machine learning using a Decision Tree, such as, e.g., a Random Forest. Note that the details of each method are described in the following documents.

MACHINERY LEARNING

MLP: S. Marsland, Machine learning: an algorithmic perspective, Chapman and Hall/CRC, 2011.

LSTM: Y. Tian and L. Pan, Predicting short-term traffic flow by long short-term memory recurrent neural network, IEEE SmartCity, pp. 153-158, 2015.

CNN: S. Ji, W. Xu, M. Yang, and K. Yu, 3D Convolutional Neural Networks for Human Action Recognition, IEEE Trans. Pattern Analysis and Machine Intelligence, vol. 35, no. 1, 2013, pp. 221-231.

Random Forest: Z.-H. Zhou, "Ensemble Methods: Foundations and Algorithms," 1st edition, Chapman & Hall/CRC, 2012.

FEATURE SELECTION

Perturb and Weights: M. Gevrey, I. Dimopoulos, and S. Lek, Review and comparison of methods to study the contribution of variables in artificial neural network models, Ecological modeling, vol. 160, no. 3, 2003, pp. 249-264.

Impurity: L. Breiman, Classification and regression trees, Routledge, 2017.

The embodiments of the present invention have been described above with reference to the attached drawings, but the present invention is not limited to the illustrated embodiments. It should be understood that various modifications and variations can be made to the illustrated embodiments falling within the same or equivalent scope as the present invention.

DESCRIPTION OF SYMBOLS

1: Information terminal device
11: Data acquisition unit
12: Data holding unit
13: Transmission unit
14: Control unit
2: Server computer
21: Reception unit
22: Extraction unit
23: Learning unit
24: Importance determination unit
25: Generation unit

The invention claimed is:

1. A learning-type real space information generation system comprising:

a plurality of information terminal devices; and a server computer connected to the plurality of information terminal devices via a network in a communicable state, the server computer being configured to collect sensor data acquired by each of the plurality of information terminal devices and generate real space information by learning, wherein the information terminal device includes:

a data acquisition unit configured to acquire the sensor data of a real space:

a data holding unit configured to hold a plurality of sensor data acquired by the data acquisition unit;

a transmission unit configured to transmit the sensor data held by the data holding unit to the server computer via the network; and a control unit configured to control a transmission of the sensor data by the transmission unit, wherein the server computer includes:

a reception unit configured to receive the sensor data transmitted by the information terminal device via the network;

an extraction unit configured to extract elements configuring the real space information from the sensor data received by the reception unit;

an importance determination unit configured to determine an importance of each element of the elements configuring the real space information, wherein the importance of each element of the elements is transmitted to the control unit of the information terminal device, wherein a first set of elements have a high importance for the importance of each element in the first set of elements based on feature amounts of the first set of elements varying over a period of time, and wherein a second set of elements have a low importance for the importance of each element in the second set of elements based on feature amounts of the second set of elements not varying over the period of time;

a learning unit configured to train and generate a feature model of the real space information of a predetermined pattern based on the first set of elements and the second set of elements that configure the real space information extracted by the extraction unit from past sensor data received by the reception unit; and a generation unit configured to generate the real space information using the feature model based on the elements configuring the real space information extracted by the extraction unit from most recent sensor data received by the reception unit, wherein the control unit of the information terminal device controls the transmission unit to transmit the sensor data corresponding to the first set of elements having the high importance to configure the real space information based on the importance of each element determined by the importance determination unit of the server, for a plurality of sensor data stored in the data holding unit, wherein the generation unit of the server computer generates the real space information using the feature model based on the first set of elements configuring the real space information extracted by the extraction unit from the most recent sensor data received by the reception unit, and wherein the control unit controls the transmission unit to transmit all the sensor data corresponding to the elements configuring the real space information when a communication environment is a high-speed communication environment and transmits the sensor data corresponding to the first set of elements configuring the real space information when the communication environment is a low-speed communication environment.

2. The learning-type real space information generation system as recited in claim 1, wherein the control unit controls the transmission unit to transmit all the sensor data corresponding to the elements configuring the real space information when a stored energy of the information terminal device is equal to or greater than a predetermined value, and transmits the sensor data corresponding to the first set of elements configuring the real space information when the stored energy of the information terminal device is less than the predetermined value.

3. The learning-type real space information generation system as recited in claim 1, wherein the learning unit generates a feature model of a pattern in which the elements configuring the real space information are arranged multidimensionally.

4. The learning-type real space information generation system as recited in claim 3, wherein the learning unit generates a feature model of a pattern in which the elements configuring the real space information are arranged two dimensionally, the pattern being composed of any one of a combination of time information and spot information, time information and identification information, longitude information and latitude information, and spot information and word information.

5. The learning-type real space information generation system as recited in claim 1, wherein the importance determination unit determines the importance of each element based on a change in a feature amount of each element configuring the real space information in the feature model of the real space information of a predetermined pattern.

6. A learning-type real space information generation system comprising:

a plurality of information terminal devices; and a server computer connected to the plurality of information terminal devices via a network in a communicable state, the server computer being configured to collect sensor data acquired by each of the plurality of information terminal devices and generate real space information by learning, wherein the information terminal device includes:

a data acquisition unit configured to acquire the sensor data of a real space:

a data holding unit configured to hold a plurality of sensor data acquired by the data acquisition unit;

a transmission unit configured to transmit the sensor data held by the data holding unit to the server computer via the network; and a control unit configured to control a transmission of the sensor data by the transmission unit, wherein the server computer includes:

a reception unit configured to receive the sensor data transmitted by the information terminal device via the network;

an extraction unit configured to extract elements configuring the real space information from the sensor data received by the reception unit;

an importance determination unit configured to determine an importance of each element of the elements configuring the real space information, wherein the importance of each element of the elements is transmitted to the control unit of the information terminal device, wherein a first set of elements have a high importance for the importance of each element in the first set of elements based on feature amounts of the first set of elements varying over a period of time, and wherein a second set of elements have a low importance for the importance of each element in the second set of elements based on feature amounts of the second set of elements not varying over the period of time;

a learning unit configured to train and generate a feature model of the real space information of a predetermined pattern based on the first set of elements and the second set of elements that configure the real space information extracted by the extraction unit from past sensor data received by the reception unit; and a generation unit configured to generate the real space information using the feature model based on the elements configuring the real space information extracted by the extraction unit from most recent sensor data received by the reception unit, wherein the control unit of the information terminal device controls the data acquisition unit to acquire the sensor data corresponding to the first set of elements having the high importance to configure the real space information based on the importance of each element determined by the importance determination unit of the server, wherein the generation unit of the server computer generates the real space information using the feature model based on the first set of elements configuring the real space information extracted by the extraction unit from the most recent sensor data received by the reception unit, and wherein the control unit controls the data acquisition unit to acquire all the sensor data corresponding to the elements configuring the real space information when a communication environment is a high-speed communication environment and acquires the sensor data corresponding to the first set of elements configuring the real space information when the communication environment is a low-speed communication environment.

7. The learning-type real space information generation system as recited in claim 6, wherein the control unit controls the data acquisition unit to acquire all the sensor data corresponding to the elements configuring the real space information when a stored energy of the information terminal device is equal to or greater than a predetermined value, and acquires the sensor data corresponding to the first set of elements configuring the real space information when the stored energy of the information terminal device is less than the predetermined value.

8. A learning-type real space information generation system comprising:

a plurality of information terminal devices; and a server computer connected to the plurality of information terminal devices via a network in a communicable state, the server computer being configured to collect sensor data acquired by each of the plurality of information terminal devices and generate real space information by learning, wherein the information terminal device includes:

a data acquisition unit configured to acquire the sensor data of a real space:

a data holding unit configured to hold a plurality of sensor data acquired by the data acquisition unit;

a transmission unit configured to transmit the sensor data held by the data holding unit to the server computer via the network; and a control unit configured to control a transmission of the sensor data by the transmission unit, wherein the server computer includes:

a reception unit configured to receive the sensor data transmitted by the information terminal device via the network;

an extraction unit configured to extract elements configuring the real space information from the sensor data received by the reception unit;

an importance determination unit configured to determine an importance of each element of the elements configuring the real space information, wherein the importance of each element of the elements is transmitted to the control unit of the information terminal device, wherein a first set of elements have a high importance for the importance of each element in the first set of elements based on feature amounts of the first set of elements varying over a period of time, and wherein a second set of elements have a low importance for the importance of each element in the second set of elements based on feature amounts of the second set of elements not varying over the period of time;

a learning unit configured to train and generate a feature model of the real space information of a predetermined pattern based on the first set of elements and the second set of elements that configure the real space information extracted by the extraction unit from past sensor data received by the reception unit; and a generation unit configured to generate the real space information using the feature model based on the elements configuring the real space information extracted by the extraction unit from most recent sensor data received by the reception unit, wherein the control unit of the information terminal device controls a movement of the information terminal device to acquire the sensor data corresponding to the first set of elements having the high importance to configure the rear space information by the data acquisition unit based on the importance of each element determined by the importance determination unit of the server, and wherein the generation unit of the server computer generates the real space information using the feature model based on the first set of elements configuring the real space information extracted by the extraction unit from the most recent sensor data received by the reception unit and wherein the control unit controls the movement of the information terminal device so that the data acquisition unit acquires all the sensor data corresponding to the elements configuring the real space information when a communication environment is a high-speed communication environment and the data acquisition unit acquires the sensor data corresponding the first set of elements configuring the real space information when the communication environment is a low-speed communication environment.

9. The learning-type real space information generation system as recited in claim 8, wherein the control unit controls the movement of the information terminal device so that the data acquisition unit acquires all the sensor data corresponding to the elements configuring the real space information when a stored energy of the information terminal device is equal to or greater than a predetermined value and the data acquisition unit transmits the sensor data corresponding to the first set of elements configuring the real space information when the stored energy of the information terminal device is less than the predetermined value.

\* \* \* \* \*